United States Patent [19]
Noreen et al.

[11] Patent Number: 5,303,393
[45] Date of Patent: Apr. 12, 1994

[54] INTEGRATED RADIO SATELLITE RESPONSE SYSTEM AND METHOD

[75] Inventors: Gary Noreen, Pasadena; Theodore R. Harper, Long Beach, both of Calif.

[73] Assignee: Radio Satellite Corporation, La Canada Flintridge, Calif.

[21] Appl. No.: 683,962

[22] Filed: Apr. 12, 1991

Related U.S. Application Data

[63] Continuation-in-part of Ser. No. 607,877, Nov. 6, 1990, abandoned.

[51] Int. Cl.⁵ .............................................. H04H 1/00
[52] U.S. Cl. .................................. 455/3.2; 455/12.1; 455/54.2; 455/89
[58] Field of Search ................ 455/3.1, 3.2, 5.1, 6.3, 455/12.1, 15, 54.1, 54.2, 88, 180.1, 188, 13.1, 89, 2; 358/84, 86

[56] References Cited

U.S. PATENT DOCUMENTS

| | | | |
|---|---|---|---|
| 3,683,116 | 8/1972 | Dill | 370/14 |
| 4,425,639 | 1/1984 | Acampora et al. | 370/50 |
| 4,437,183 | 3/1984 | Profet | 370/110.1 |
| 4,501,002 | 2/1985 | Auchterlonie | 375/86 |
| 4,599,734 | 7/1986 | Yamamoto | 375/40 |
| 4,635,247 | 1/1987 | Tejima | 370/13 |
| 4,635,285 | 1/1987 | Coombes | 379/63 |
| 4,660,196 | 4/1987 | Gray et al. | 370/109 |
| 4,742,512 | 5/1988 | Akashi et al. | 370/56 |
| 4,754,465 | 6/1988 | Trimble | 375/1 |
| 4,759,016 | 7/1988 | Otsuka | 370/95.3 |
| 4,837,786 | 6/1989 | Gurantz et al. | 370/20 |
| 4,852,090 | 7/1989 | Borth | 370/95.3 |
| 4,860,352 | 8/1989 | Laurance et al. | 455/12.1 |
| 4,868,811 | 9/1989 | Suzuki | 370/50 |
| 4,870,660 | 9/1989 | Keate | 375/81 |
| 4,882,730 | 11/1989 | Shinmyo | 370/95.2 |
| 4,903,320 | 2/1990 | Hanawa | 455/34.2 |
| 4,951,279 | 8/1990 | Hotta | 370/75 |
| 4,979,170 | 12/1990 | Gilhousen et al. | 455/12.1 |
| 4,987,486 | 1/1991 | Johnson et al. | 455/5.1 |
| 5,027,400 | 6/1991 | Baji et al. | 455/5.1 |
| 5,036,389 | 7/1991 | Morales | 455/5.1 |
| 5,057,915 | 10/1991 | Von Kohorn | 455/5.1 |
| 5,119,504 | 6/1992 | Duroboraw, III | 455/54.1 |

*Primary Examiner*—Reinhard J. Eisenzopf
*Assistant Examiner*—Andrew Faile
*Attorney, Agent, or Firm*—David Newman & Associates

[57] ABSTRACT

A radio response system including a broadcast station, a satellite relay, a processing center, and a plurality of user terminals. Each user terminal has a broadcast receiver, a communications interface device, a controller and a data transmitter. The broadcast station broadcasts a program signal. The broadcast receiver receives the program signal. The communications interface device communicates the program signal to a user. The controller generates a user-data signal from identification information transmitted in connection with the program signal and/or timing, location and frequency information needed for identifying the program signal, and a user-input signal generated in response to the program signal. The data transmitter transmits the user-data signal at a carrier frequency as a transmitted-data signal. The satellite relays the user-data signal to the processing center.

14 Claims, 8 Drawing Sheets

INTEGRATED RADIO SATELLITE RESPONSE SYSTEM AND METHOD

RELATED PATENTS

This patent is a continuation-in-part of an application entitled, RECEIVER MICROCHIP PROCESSOR, having Ser. No. 07/607,877, abandoned and Filing Date of Nov. 6, 1990.

BACKGROUND OF THE INVENTION

This invention relates to communication satellites and more particularly to a mobile satellite terminal which allows greatly expanded access by mobile radio users to diverse audio programming sources and communication and navigation services, and an ability to order products or services offered for sale, make contributions, and directly respond in other ways to solicitations or information provided over radio channels.

DESCRIPTION OF THE PRIOR ART

Mobile radio listeners generally have not received the benefits of diverse programming and "narrowcasting" alternatives available to television audiences in their homes through cable and satellite distribution networks. The prospect of accessing alternative programming beyond existing AM and FM stations is poor. National Public Radio ("NPR") has noted repeatedly that the need for additional channels of distribution is urgent and that the development of digital audio broadcast service is necessary for effective competition with new forms of aural media. Remote areas in particular are inadequately served by terrestrial radio broadcasters. Public radio, for example, is expected to reach only 90% of the population of the Continental United States by the year 2000. "Public Radio in the 1990's—Fulfilling the Promise," The Report of the Public Radio Expansion Task force—January 1990, at page 11. Industry analysts conclude that "closing this service availability gap will be disproportionately costly due to the low population densities in most of these unserved areas. The remaining increments of improved coverage will require substantial spending increments far in excess of the per capita costs which have culminated in the current level of service and could still leave some 30 million Americans without public radio service at the turn of the century." Comments of National Public Radio, Federal Communications Commission, Gen. Docket No. 89-854, Feb. 16, 1990.

A system allowing a mobile user to directly order from radio advertisements, make contributions to solicitations received over radio channels, and respond directly to other information received over radio channels, has heretofore not been offered.

OBJECTS OF THE INVENTION

A general object of the invention is a radio response system permitting the integration of analog or digital audio broadcast services with personal communications services and navigation services into low-cost mobile radios, and an ability, from a mobile terminal, to signal an emergency condition or to order products or services offered in advertisements, to contribute in response to solicitations, or respond to other information, received from broadcast service, by the broadcast services.

An object of the invention is to provide a radio response system allowing a wide array of integrated mobile radio services to consumers, business users and government agencies via low-cost mobile terminals. The services include alphanumeric and voice paging, one-way and two-way voice and data communications, navigation, broadcast data and digital audio broadcasting services.

Another object of the invention is to optionally allow integration of microprocessors designed to analyze signals from navigation satellites, such as the U.S. Global Positioning System, with the mobile terminal, so that navigation broadcasts and differential corrections sent through the mobile satellite terminal could be used to estimate positions of vehicles within one or two meters.

Another object of the invention is a low-cost mobile terminal allowing additional voice and data channels to many users throughout the country who are currently underserved, and an ability to order goods or services offered for sale over these channels.

An additional object of the invention is a consumer device that allows reception of audio broadcasts that can vary in bandwidth and in spectrum location.

A still further object of the invention is to bring diverse satellite services to the public at very low cost.

SUMMARY OF THE INVENTION

According to the present invention, as embodied and broadly described herein, a radio response system for use with a processing center is provided comprising transmitter means, repeater means, and a plurality of mobile terminals. Location means optionally may be used with the radio response system. Each mobile terminal includes receiver means, interface means, controller means and data-transmitter means.

The transmitter means broadcasts a program signal. The program signal may use analog modulation, such as AM or FM, or a digital modulation technique, such as phase shift keying (PSK). The transmitter means may be a terrestrial broadcast transmitter or a satellite broadcast transmitter.

At a mobile terminal, receiver means receives the program signal. The receiver means may use an AM receiver, an FM receiver, a digital receiver, receiving terrestrial or satellite broadcasts.

The interface means communicates the program signal to a user. The interface means may be a speaker or visual display. The interface means also has an input transducer, such as a microphone, push buttons or a touch screen. A user can respond to a program signal verbally, such as by speaking through a microphone, or physically, such as by pushing a push button or touching a touch screen. The input transducer generates a user-input signal.

The controller means processes identification information from the program signal or determines frequency of transmission of the program signal, and generates from the processed information, timing information, and the user-input signal, a user-data signal. The controller means may be a processor. The identification information, if provided may be sent on a subchannel of the program signal. In an AM or FM signal, the subchannel might be on a subcarrier of the program signal. In a digital signal, the subchannel might be a time slot in a time division multiplexed signal.

The data-transmitter means transmits the user-data signal as a transmitted-data signal. The data-transmitter means preferably is a data transmitter which sends the transmitted-data signal to the repeater means.

When a transmitted-data signal is received from a mobile terminal, the repeater means relays the transmitted-data signal to the processing center. The repeater means may be a terrestrial repeater or a satellite repeater. The processing center, which receives the transmitter-data signal from the repeater means, demodulates the user-data signal from the transmitted-data signal, processes information on the user-data signal, identifies the program signal and the nature of the response of the user from the user-input signal, and the identity of the mobile terminal. The processing center can process an order, contribution or other response sent from a mobile terminal.

The location means may be a position locator device in the mobile unit, or satellite triangulation or geopositioning system. When at least two satellites relay the transmitted-data signal, i.e. the location means receives the transmitted-data signal from at least two satellites, then the location means can determine the position of the mobile terminal by triangulation.

The present invention may use a radio satellite microchip (RSM), which includes an assignable demodulator, an assignable decoder, a Time Division Multiplex (TDM) demodulator, a TDM decoder, control means, audio decompressor and D/A converter, and data coder and modulator. The RSM is used with a mobile radio satellite terminal having a message display, an input device, satellite RF electronics, and, optionally a transmitter. The satellite RF electronics converts a received electromagnetic signal to an assignable-IF (Intermediate Frequency) signal and a TDM-IF signal in response to a first frequency-command signal. The transmitter selects and adjusts a carrier frequency in response to a second frequency-command signal. The transmitter transmits as a modulated-data signal, a transmitter-IF signal modulated with a data signal.

The assignable demodulator operatively is coupled to the satellite RF electronics. Using the assignable-data-rate signal and the assignable-IF signal, the assignable demodulator generates a first frequency-error signal and outputs the assignable-IF signal as an in-phase-assignable signal and a quadrature-phase-assignable signal. The assignable decoder, which is coupled to the assignable demodulator, convolutionally decodes the in-phase-assignable signal and the quadrature-phase-assignable signal as an assignable-data signal.

The TDM demodulator operatively is coupled to the satellite RF electronics. Using a TDM-data-rate signal and the TDM-IF signal, the TDM demodulator generates a second frequency-error signal and outputs the TDM-IF signal as an in-phase TDM signal and a quadrature-phase TDM signal. The TDM decoder, which is coupled to the TDM demodulator, convolutionally decodes the in-phase-TDM signal and the quadrature-phase-TDM signal as a TDM data signal.

The control means operatively is coupled to the TDM decoder, the transmitter, and the satellite RF electronics. The control means deinterleaves and decommutates the TDM-data signal as a control signal, paging signals and message signals. The control means, in response to the control signal, generates the first frequency-command signal and the second frequency-command signal. The control means, in response to the first frequency error signal and the second frequency-error signal, generates a Doppler-correction signal. The control means outputs the message signals to memory and/or the message display, synthesizes the transmitter-IF signal, and generates the assignable-data-rate signal and the TDM-data-rate signal.

The control signal includes a look-up table broadcast periodically that identifies the name, frequency of operation and data rate of assignable broadcast channels. This lookup table is stored by the control means and updated periodically. The control means uses the lookups table to identify and tune-in broadcast to the assignable channel.

The audio decompressor and D/A converter operatively are coupled to the assignable decoder. The audio decompressor deinterleaves and decompresses the assignable data signal, and the D/A converter converts this signal to an analog signal. The data coder and modulator operatively are coupled to the control means and the input device. In response to data signals from the input device, the data coder and modulator convolutionally encode and QPSK modulate the data signal at the frequency of the transmitter-IF signal.

The control means adjusts the frequency of the transmitter-IF signal in response to the Doppler-correction signal.

The present invention, when used with a radio satellite system, offers the benefits of integrated nationwide personal communications and navigation services. These services include paging (both alphanumeric and voice), two-way voice and data communications, broadcast data, a low-cost navigation service and a precision navigation capability. The radio satellite system is extraordinarily flexible.

With the radio satellite system, consumers may listen to the high quality broadcasts nearly everywhere they go, through a spectrum efficient system that can receive broadcasts of difference bandwidths and data matter. They may communicate while on the move from virtually anywhere in the country at low cost. They may obtain these and other services through low-cost, integrated car radios. The radio satellite system offers a revolution in mobile communications capability for consumers everywhere in the United States.

Additional objects and advantages of the invention will be set forth in part in the description which follows, and in part will be obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

FIG. 3D is a block diagram of an assignable demodulator and decoder according to the present invention;

DETAILED DESCRIPTION OF THE PREFERRED EMBODIMENTS

Reference will now be made in detail to the present preferred embodiments of the invention, examples of which are illustrated in the accompanying drawings, wherein like reference numerals indicate like elements throughout the several views.

The radio response system and method can be used with terrestrial broadcast transmitters such as AM and FM, or digital broadcast transmitters which may be terrestrial or satellite based. A radio satellite network, which employs a radio satellite microchip, is initially disclosed, then the radio response system, which optionally may use the radio satellite microchip, is disclosed.

Radio Satellite Network

Figure 1:
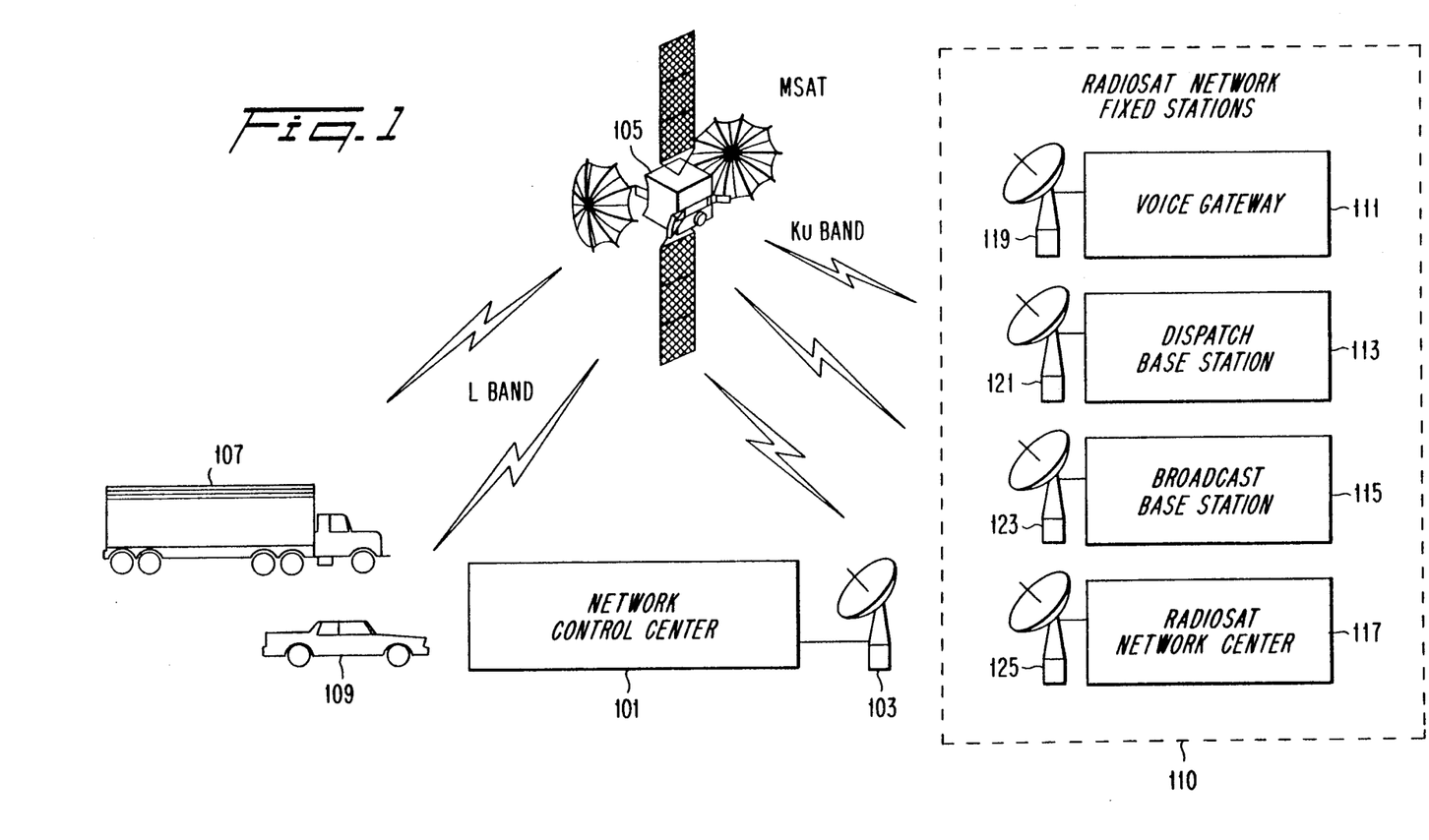
FIG. 1 is a radio satellite network diagram.

As illustratively shown in FIG. 1, a radio satellite network diagram is shown comprising capacity on a satellite capable of transmissions to mobile units (MSAT) 105, a network control center 101, a plurality of fixed stations 110, and mobile users. The mobile users use a mobile terminal. The network control center 101 is coupled through antenna 103 via a communications channel to MSAT 105. The mobile users, by way of example, are a truck 107 and automobile 109. The mobile users are coupled via a communications channel at an appropriate frequency, such as L-band, to MSAT 105.

The network fixed stations 110 include voice gateway 111, dispatch base station 113, broadcast base station 115, and radio satellite network center 117. The voice gateway 111 is coupled through antenna 119 via a Ku-band communications channel to MSAT 105. The dispatch base station 113 is coupled through antenna 121 via a Ku-band communications channel to MSAT 105. The broadcast base station 115 is coupled through antenna 123 via a Ku-band communications channel to MSAT 105. The radio satellite network center 117 is coupled through antenna 125 via a Ku-band communications channel to MSAT 105.

The network control center 101 is responsible for the overall use of the satellite. The radio satellite network center 117 controls the radio satellite network used in the present invention. The voice gateway 111 interfaces telephone and other voice communications with the radio satellite network. The dispatch base station 113 provides voice dispatches, and the broadcast base station 115 provides digital audio and high rate data broadcasts.

Figure 2:
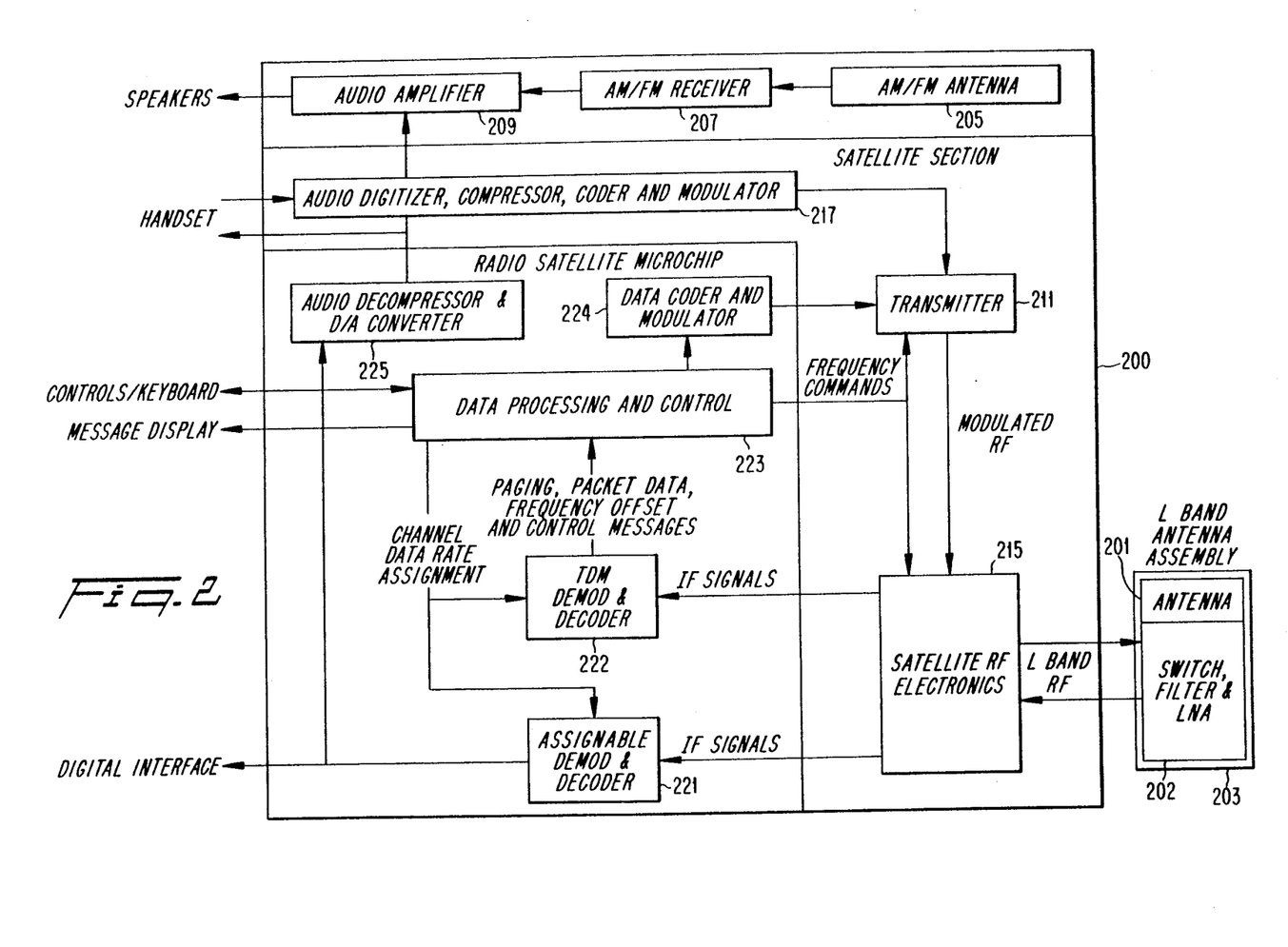
FIG. 2 is a block diagram of a mobile station.

In the exemplary arrangement shown in FIG. 2, a mobile terminal, shown as a mobile station satellite receiver 200, may include: a radio satellite microchip (RSM); an optional audio processor 217; an optional transmitter 211; satellite RF electronics 215; and L-band antenna assembly 203. The L-band antenna 201 is coupled to the L-band antenna assembly 203, which is coupled through switch, filter and low noise amplifier 202 to the satellite RF electronics 215. The L-band antenna 201 typically is an omnidirectional antenna, mounted on a roof of vehicle, and is used for transmitting and receiving. The L-band antenna assembly 203 includes a transmit/receive filter and a low noise amplifier 202. A terminal box may include a conventional AM/FM receiver 207 connected to an AM/FM antenna 205, with the addition of the radio satellite microchip (RSM) and satellite RF electronics. For optimum performance, separate AM/FM and L-band antennas are used.

Mobile stations simultaneously receive two channels: a time division multiplex (TDM) data channel and an assignable channel. Both TDM and assignable channel transmissions broadcast to all mobiles; coding in the transmissions and in the receivers allows portions of broadcasts to be addressed to all mobiles, to groups of mobiles or to individual mobiles. This architecture allows mobile stations simultaneous access to all services. For example, packet data and paging messages can be sent over the TDM data channel. High rate data for digital services such as facsimile machines or high quality digital program data such as music can be sent over the assignable channel. Broadcast transmissions can be interleaved to mitigate the effects of short-term fading.

As shown in FIG. 2, a user has transmitter 211, providing the user a two-way communications terminal. Low rate packet data messages from an input panel, which may be embodied as an external keyboard or message generator, can be communicated in the TDM channel. An optional audio processor 217 may be included, and may be embodied as an audio processor chip. The audio processor 217 digitizes voice signals to a selected bit rate, preferably in the 1,200–9,600 bps range, depending on the voice quality desired for transmission.

A variety of peripheral devices may be used with the terminal. The basic configuration may provide compact disk or other quality program material through standard vehicle radio speakers, and display of paging or other messages. Dispatch terminals or a handset for voice communication can be added. A digital interface is included for facsimile machines or other functions.

The transmit/receive filter 202 isolates the transmitting RF signal from a received signal. The received signal is amplified by the low noise amplifier 202. Signals from the L-band antenna assembly 203 pass to the receiver which is mounted inside the vehicle, by a common cable, which also provides DC power and control.

The satellite RF electronics 215 is coupled to the transmitter 211, which is connected to the audio processor 217. The satellite RF electronics 215 converts a received signal from the L-band assembly 203, using the satellite RF electronics 215, to an assignable-IF signal and a TDM-IF signal. A first frequency-command signal from the data processing and controller 223 controls the frequency setup of the satellite RF electronics 215 to convert the frequencies of the received signal to the frequencies of the assignable-IF signal and the TDM-IF signal. While a preferred embodiment might use a binary-phase-shift-keying (BPSK) or quadrature-phase-shift-keying (QPSK) modulation, alternative implementations may include other types of modulation. Offset QPSK modulation, by way of example, might be used to minimize occupied bandwidth, and bit interleaving might be used for mitigating effects from short-term fade.

The RSM includes an assignable demodulator and decoder 221, a TDM demodulator and decoder 222, processing means embodied as a data processing and controller 223, audio decompressor and D/A converter 225, and data coder and modulator 224.

Broadly, the satellite RF electronics 215 receives a signal from the L-band antenna assembly 203 and converts the received signal to two IF signals: an assignable-IF signal and a TDM-IF signal. The assignable-IF signal is sent to the assignable demodulator 221. The TDM-IF signal is sent to the TDM demodulator 222. Two separate IF converters are used with independent frequency synthesizers. The synthesizers are controlled by the data processing and controller 223 function of the RSM. The satellite RF electronics 215 also serves as a junction box for the common cable and connection to the transmitter 211.

The data processing and controller 223 provide channel rate assignment to the TDM demodulator 222 and assignable demodulator 221. Further, the TDM demodulator 221 provides paging, packet data, frequency offset and control signals to the data processing and controller 223. The data processing and controller 222 provides frequency information to the data coder and modulator 224, deinterleaves received data streams, and sends and receives messages to and from an input panel and a message display. A more detailed view of FIG. 2 is shown in FIGS. 3A-3E.

Figure 3A:
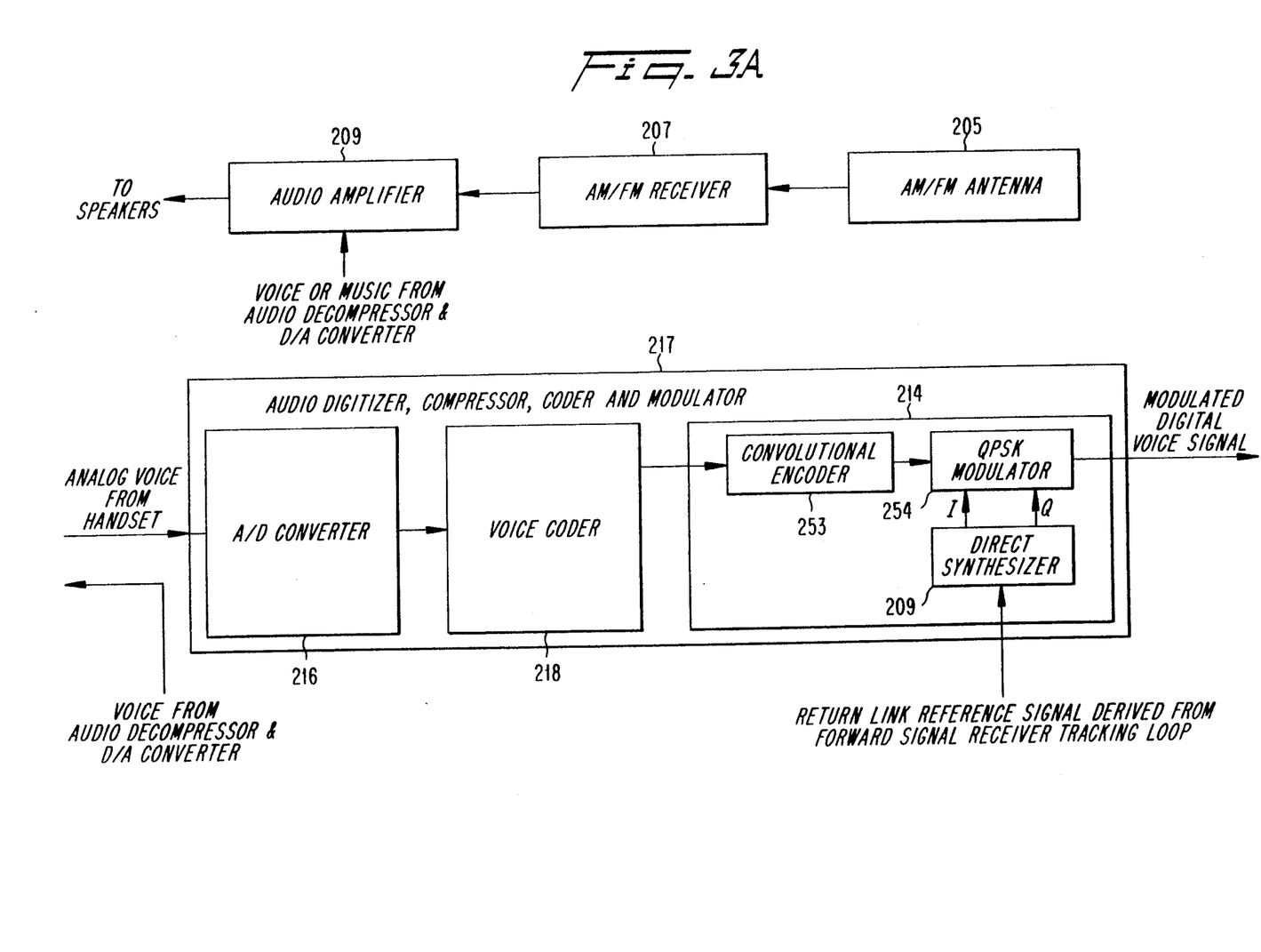
FIG. 3A is a block diagram of the audio digitizer, compressor, coder and modulator.

FIG. 3A shows the AM/FM receiver portion and the audio processor 217. Voice signals are converted by audio processor 217 using A/D converter 216 to digital signals, and audio processor 217 uses a voice coder 218 for source encoding, thereby reducing the data rate. The signals from the voice coder 218 are convolutionally encoded by convolutional encoder 253, and modulated by QPSK modulator 254. The QPSK modulator 254 may use various forms of QPSK modulation. Offset QPSK might be used to minimize occupied bandwidth. Also, bit interleaving may be used to minimize effects of fade.

Figure 3B:
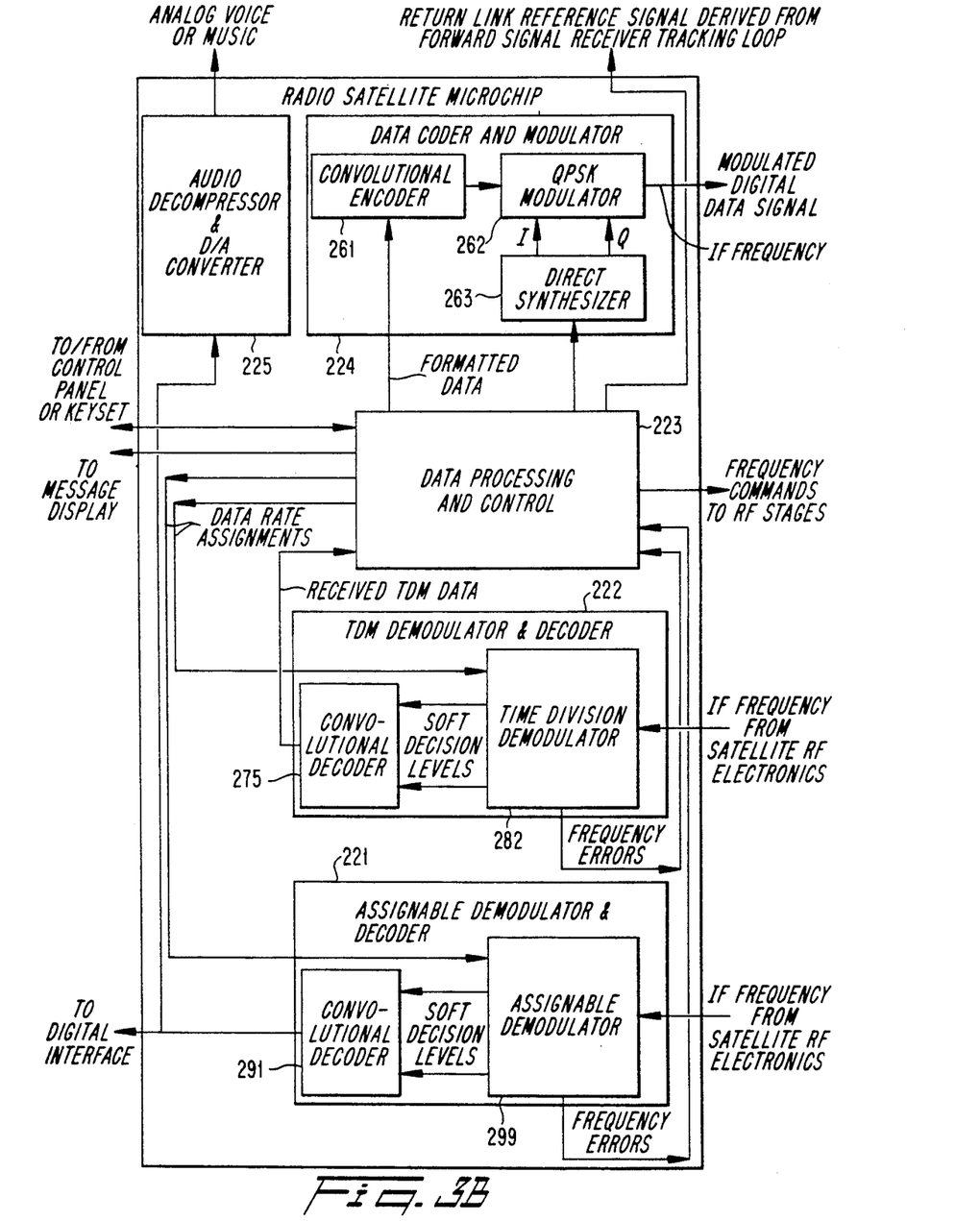
FIG. 3B is a block diagram of the microchip of the present invention.

In the exemplary arrangement shown in FIG. 3B, the RSM includes an assignable demodulator and decoder 221, a TDM demodulator and decoder 222, control means, audio decompressor and D/A converter 225, and data coder and modulator 224. The assignable demodulator and decoder 221 may be viewed as an assignable demodulator 299 and an assignable decoder 291. The TDM demodulator and decoder 222 may be viewed as a TDM demodulator 282 and a TDM decoder 275. The control means is embodied as data processing and controller 223. The RSM is used with a radio satellite terminal having a message display, an input, satellite RF electronics, and a transmitter 221.

Figure 3C:
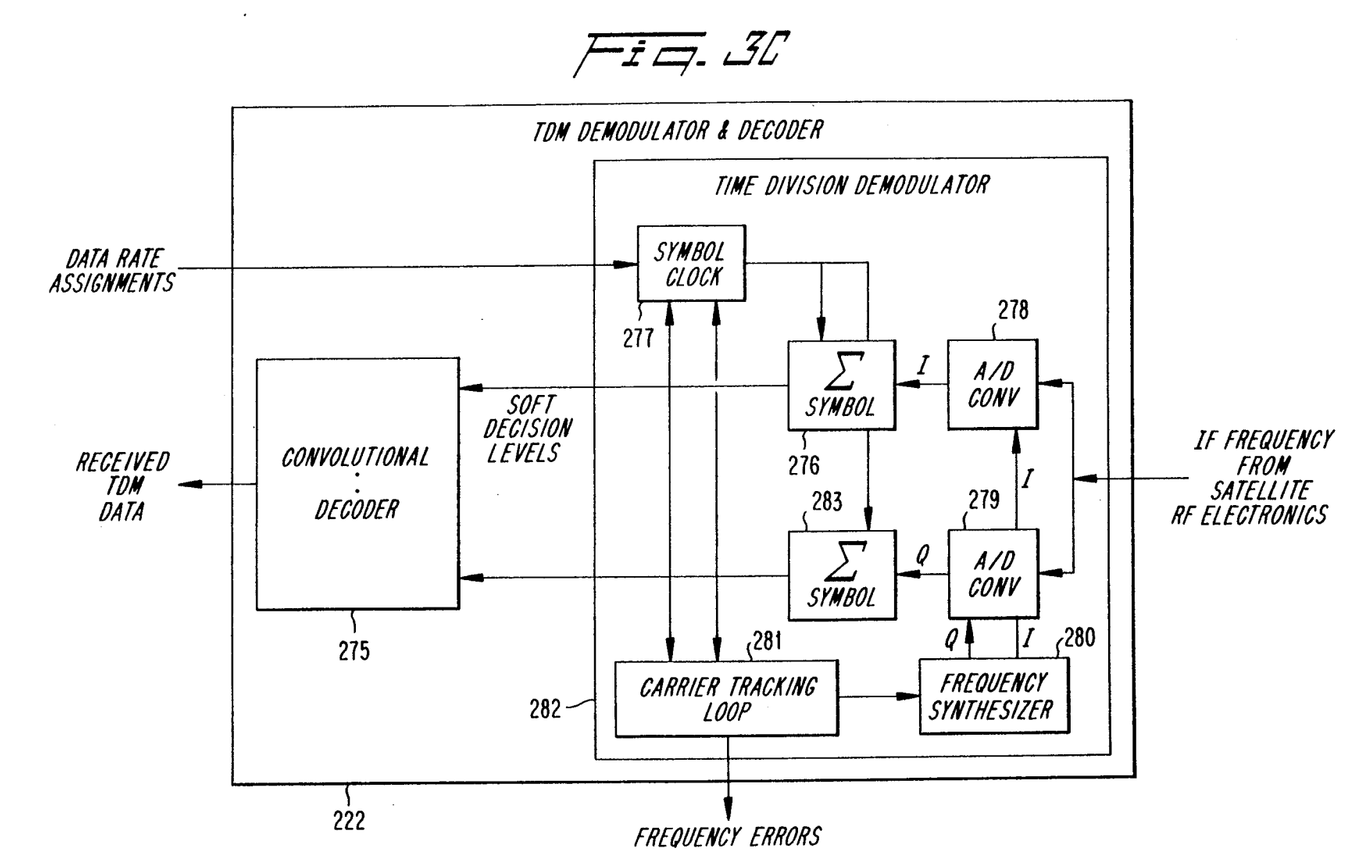
FIG. 3C is a block diagram of a TDM demodulator and decoder according to the present invention.

A block diagram of a TDM demodulator 282 is shown in FIG. 3C. The TDM demodulator 282 operatively is coupled to the satellite RF electronics 215. In response to a TDM-data-rate signal from data processing and controller 223, the TDM demodulator 282 using symbol clock 277 adjusts its electronics to accommodate received signals having various data rates. The TDM demodulator 282 using carrier tracking loop 281 generates a second frequency-error signal by comparing to a local signal, the frequency of the TDM-IF signal from satellite electronics 215. The TDM demodulator 282 demodulates the TDM-IF signal from satellite RF electronics 215 to an in-phase TDM signal and a quadrature-phase TDM signal by using appropriate in-phase and quadrature-phase circuitry. The TDM demodulator 282 also digitizes the in-phase TDM signal and quadrature-phase TDM signal using A/D converters 278, 279, and averages or filters the output of A/D converters 278, 279 using symbol devices 276, 283, respectively. Thus, the in-phase-TDM signal and the quadrature-phase-TDM signal can be digital or data signals.

The TDM decoder 275 operatively is coupled to the TDM demodulator 282. The TDM decoder 275 convolutionally decodes the in-phase-TDM signal and the quadrature-phase-TDM signal from symbol devices 276, 283 as a TDM data signal.

A block diagram of an assignable demodulator 299 is shown in FIG. 3D. The assignable demodulator 299 operatively is coupled to the satellite RF electronics 215. The assignable demodulator 299 using symbol clock 292 adjusts its electronics to accommodate received signals having various data rates, in response to an assignable-data-rate signal from data processing and controller 223. The assignable demodulator 299 generates a first frequency-error signal by comparing to a local signal, the frequency of the assignable-IF signal from satellite RF electronics 215. The assignable demodulator 299 converts the assignable-IF signal from satellite RF electronics 215 to an in-phase-assignable signal and a quadrature-phase-assignable signal, by using appropriate in-phase and quadrature-phase circuitry. The assignable demodulator 299 also digitizes the in-phase assignable signal and the quadrature-phase assignable signal using A/D converters 295, 296, and averages or filters the output of A/D converters 295, 296 using symbol devices 293, 294, respectively. Thus, the in-phase-assignable signal and the quadrature-phase-assignable signal can be digital or data signals.

The assignable decoder 291 operatively is coupled to the assignable demodulator 299. The assignable decoder 291 convolutionally decodes the in-phase-assignable signal and the quadrature-phase-assignable signal from symbol devices 293, 294 as an assignable-data signal. The assignable-data signal is provided to a digital interface and to the audio decompressor and D/A converter 225.

The data processing and controller 223 of FIG. 3B operatively is coupled to the TDM decoder 275, the transmitter 211, and the satellite RF electronics 215. The data processing and controller 223 receives TDM data embedded in the TDM-data signal from TDM decoder 275, and decommutates the TDM-data signal as a control signal, paging signals and message signals. The data processing and controller 223, in response to the control signal from the TDM-data signal, generates the first frequency-command signal and the second frequency-command signal. The first frequency-command signal is used to control the frequencies, i.e. the frequency settings, of the satellite RF electronics 215. The frequency selections control the part of the RF frequency band that is provided to the TDM demodulator 222 and to the assignable demodulator 221. The second frequency command signal is used to select the frequency of the transmitter 211. The data processing and controller 223 also generate a Doppler-correction signal from analysis of the first frequency-error signal received from assignable demodulator 299, and the second frequency-error signal received from TDM demodulator 282. The Doppler-correction signal includes information for correcting for Doppler shift of the transmitted waveform, which is referred to as the modulated-data signal. The correction is derived from analysis of received frequency error data.

The data processing and controller 223 stores data as needed, outputs message signals to the message display, synthesizes or controls the carrier signal of the transmitter 211, and generates the assignable-data-rate signal and the TDM-data-rate signal. The data processing and controller 223 uses data rate assignments from the input device or from received messages, including the periodically broadcast lookup table, to assign the data rate to be used by the TDM demodulator 282 and TDM decoder 275. The data rates are passed from the data processing and controller 223 to the TDM demodulator 282 in the TDM-data-rate signal. The data rates determine the TDM demodulator 282 and TDM decoder 275 symbol clock rate. A tracking loop in a symbol clock synchronizes the timing signals with the arriving TDM signal, and a carrier tracking loop in the TDM demodulator 282 is commanded by the data rate command to synthesize a clock that will sample the signal at an appropriate rate.

The data processing and controller 223 also uses the data rate assignments to assign the data rates to be employed by the assignable demodulator 299 and assignable decoder 291. These data rates are passed from the data processing and controller 223 to the assignable demodulator 299 in the assignable-data-rate signal. The data processing and controller 223 sets the synthesized frequency to be used by assignable demodulator 299 for demodulating the assignable-IF signal. Typically, the synthesized frequency is a harmonic of the symbol rate.

The data processing and controller 22 controls the transmission of data. Data from the input panel or keyset is formatted into the messages required by the network protocol by the data processing and controller 223 and provided to the data coder and modulator 224.

The data coder and modulator 224 of FIG. 3B operatively are coupled to the data processing and controller 223 and the input device. The data coder and modulator 224 convolutionally encode using convolutional encoder 261 the data and QPSK, or offset QPSK, modulates using QPSK modulator 262, the data signals from the input panel at the frequency of the transmitter-IF signal an IF frequency. The signal for the IF is synthesized by direct synthesizer 263 under control of the data processing and controller 223.

The audio decompressor and D/A converter 225 operatively are coupled to the data processing and controller 223. The audio decompressor and D/A converter 225 deinterleaves the assignable-data signal and converts it to output analog signals such as analog program material or voice messages. These are provided to a handset or the AM/FM receiver audio amplifier 209.

Figure 3E:
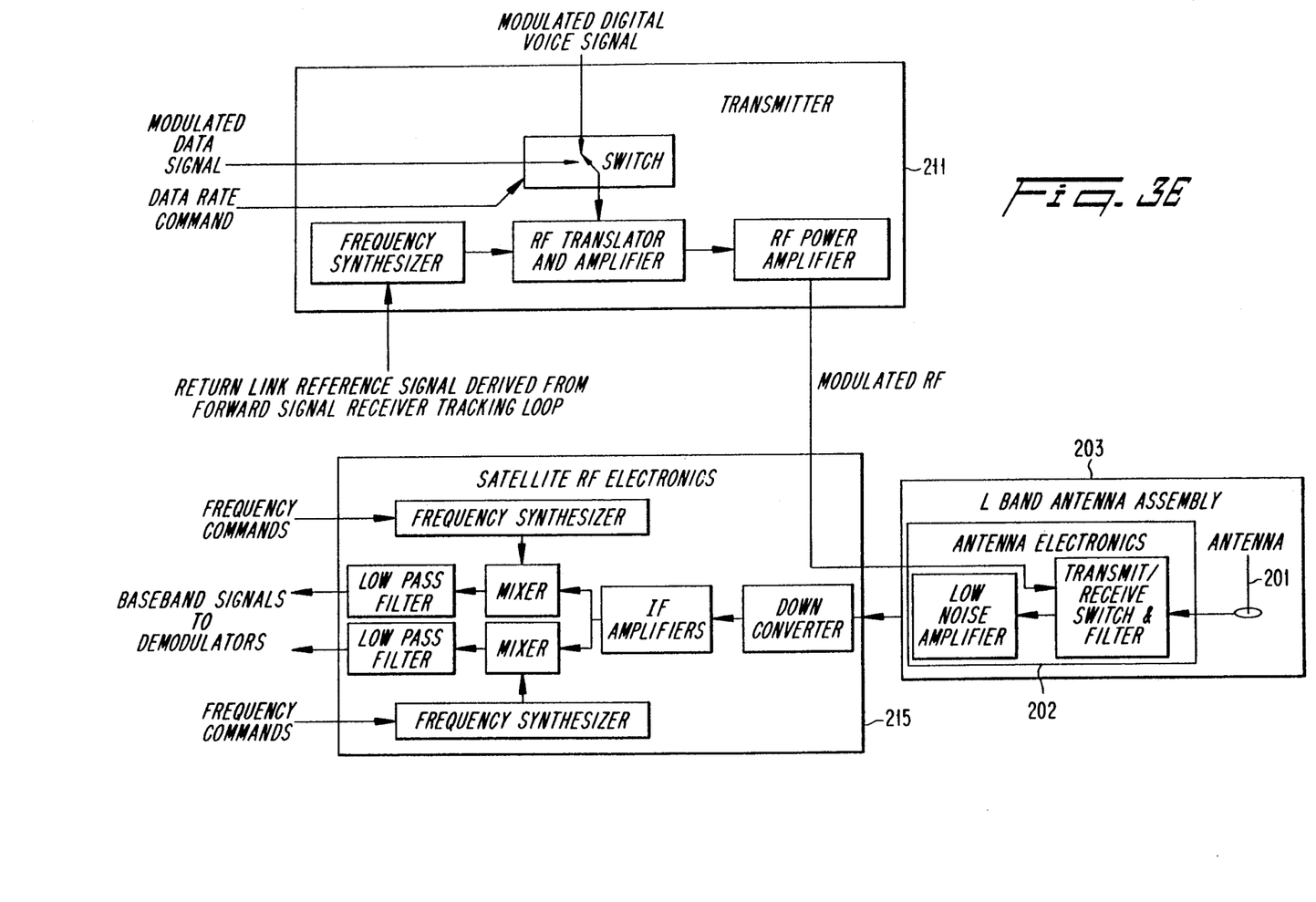
FIG. 3E is a block diagram of the transmitter and satellite RF electronics.

FIG. 3E shows the transmitter 211, satellite RF electronics 215 and L-band antenna assembly 203. The carrier frequency of the transmitter 211 is set or adjusted by the second frequency-command signal from the data processing and controller 223. The transmitter 211 converts, from data coder and modulator 224, a transmitter-IF signal which is modulated with a data signal, to a modulated-data signal, and transmits the modulated-data signal on a carrier frequency. The transmitter 211 synthesizes using the frequency synthesizer the carrier frequency in response to a control signal from the data processing and controller 223. Also, the data processing and controller 223 adjusts the frequency of the transmitter-IF signal in response to the Doppler-correction signal. An input switch commanded by the data processing and controller 22 selects the data input or the modulated digital voice signal. The selected data are modulated on the RF carrier as the modulated-data signal, amplified and provided to the satellite RF electronics 215.

In the present invention, the radio satellite network center 117 of FIG. 1 transmits a single TDM channel 24 hours a day. This channel controls all mobile stations and contains low rate, typically under 2.4 kbps, data broadcasts such as alphanumeric pages, GPS differential corrections and integrity updates, stock updates, sport reports, travel advisories and emergency alerts. The look-up table identifying station names, frequencies and data rates of assignable broadcast channels is sent through the TDM channel. Each mobile station receives the TDM channel from the beam in which it is located and all times when it is turned on. TDM channels preferably operate with a forward-error-correction (FEC) code rate of ¼.

The mobile station can receive transmissions from the radio satellite network center 117, broadcast base stations 115, telephone gateways 111, and dispatch base stations 113 over the assignable channel. The mobile station can receive any digital audio or high rate, 2.4 kbps or higher, data transmitter compatible with the radio satellites network. The assignable channel is received simultaneously with the TDM channel. Digital audio, facsimile and high rate data broadcast, telephone and voice dispatch transmitters and voice pages are received through the assignable channel. The assignable channel preferably uses a FEC code rate of ½. One-way transmissions through the assignable channel are interleaved to mitigate the effects of fades; two-way transmissions are not interleaved.

TDM channels and assignable channels operate at variable data rates. By way of example, minimum TDM channel data rate may be 1.2 kbps, maximum may be 108 kbps. Minimum assignable channel data rate may be 2.4 kbps, maximum may be 216 kbps.

Each mobile station requires satellite RF electronics 215 and a radio satellite microchip (RSM) as illustrated in FIG. 3B. The RSM incorporates demodulators and decoders for both channels and provides data processing and control functions. The data processing and controller 223 portion of the RSM can setup and control two-way data and voice communications. The RSM includes a data coder and modulator 224 for use with an optional data transmitter 211. An optional audio processor 217 can be added for the two-way voice communications. The audio processor 217 as a chip can include an analog-two-digital converter 216, voice coder 218, and convolutional encoder 253, QPSK modulator 254, and direct synthesizer 225. These items are connected as shown in FIG. 3B.

The location means, embodied as an optional Global Positioning System (GPS) microchip and associated RF electronics, can be added to the radio for processing navigation. The radio satellite can include GPS differential corrections and integrity information in TDM channel data broadcasts, which the RSM will receive and forward to the GPS microchip. With differential corrections, the GPS microchip can estimate mobile position to within two meters. GPS position estimates can be sent to dispatchers over the radio satellite system inbound data channels.

The GPS L1 frequency at 1575.42 MHz is between the satellite-two-mobile band, 1545–1559 MHZ, and mobile-two-satellite band, 1646.5–1660.5 MHz. This proximity to the frequencies of the receiver for the present invention make it possible for a GPS receiver to share the antenna and front end with one of the radio satellite system mobile stations, though some additional RF circuitry is required as well as a GPS microchip. The GPS microchip includes all base band circuitry necessary for receiving and processing NAVSTAR transmitters.

The location means alternatively may be located at a ground station, such as the radio satellite network center 117. The location means can process a modulated-data signal transmitted and relayed through at least two satellites, for determining the position or location of a mobile terminal.

Performance requirements are modest, consistent with mass production and distribution constraints. The L-band antenna can be a small, simple cross-polarized drooping dipole or a microstrip patch. Two-way voice communications require a diplexor instead of switch in the L-band antenna assembly and may require a mobile antenna with a 4 dBi gain rather than 3 dBi to counter act the higher loss through the diplexor.

Typically, the transmitter power radiates two watts, the mobile antenna will have a gain of 3 dBi, the mobile EIRP will be 3 dBw, with a mobile $G/T = -20$ dB/K.

The radio satellite network center 117 assembles control information and incoming data from numerous sources, including digital audio channel frequencies, pages, differential GPS corrections, messages to individual mobiles, conversation request, channel assignments, outbound broadcast channel look-up table, etc., into the TDM channel for each beam. The network center 117 encodes and modulates each TDM channel and transmits it to mobiles through the MSAT 105. The radio satellite network center 117 also receives transmissions from mobiles equipped with data transmitters and forwards received data to their appropriate destinations.

Base stations and gateways communicate with the radio satellite network center 117 through the satellite $K_u$—$K_u$ band link. The radio satellite system assigns operating frequencies and provides positive control over base and gateway station transmitters to ensure network integrity.

Broadcasters can operate their own broadcast base stations 115, transmitting a single digital audio or high rate data channel. Digital audio broadcast base stations digitize and compress audio signals, then encode and modulate these signals and transmit them at $K_u$-band to the satellite 105. The satellite 105 transponds the signals it receives from the broadcast base stations 115 to L-band and broadcasts them directly to mobile users.

Voice gateways 111 interconnect two-way telephone communications with the telephone network. Operators of voice gateways 111 operate their own facilities under the positive control of the radio satellite network control center 117.

Dispatch base stations 113 not interconnected with the telephone network can be used by individual organizations for dispatch communications with fleets of vehicles. Dispatch base stations 113 will also be controlled by the radio satellite network center 117. Voice pages can be sent through dispatch base stations 113 operated by paging companies.

The RSM is the key to the present system. The radio satellite system is taking advantage of the dramatic increases in processing capabilities of new semiconductor devices to consolidate most of the processing required by its highly sophisticated radios, preferably onto a single chip. This chip can be mass produced for very low cost.

Radio Response System and Method

The radio response system, for use with a processing center, includes transmitter means, repeater means, and a plurality of mobile terminals. Location means optionally may be used with the radio response system. Each mobile terminal includes receiver means, interface means, controller means and data transmitter means.

Figure 4:
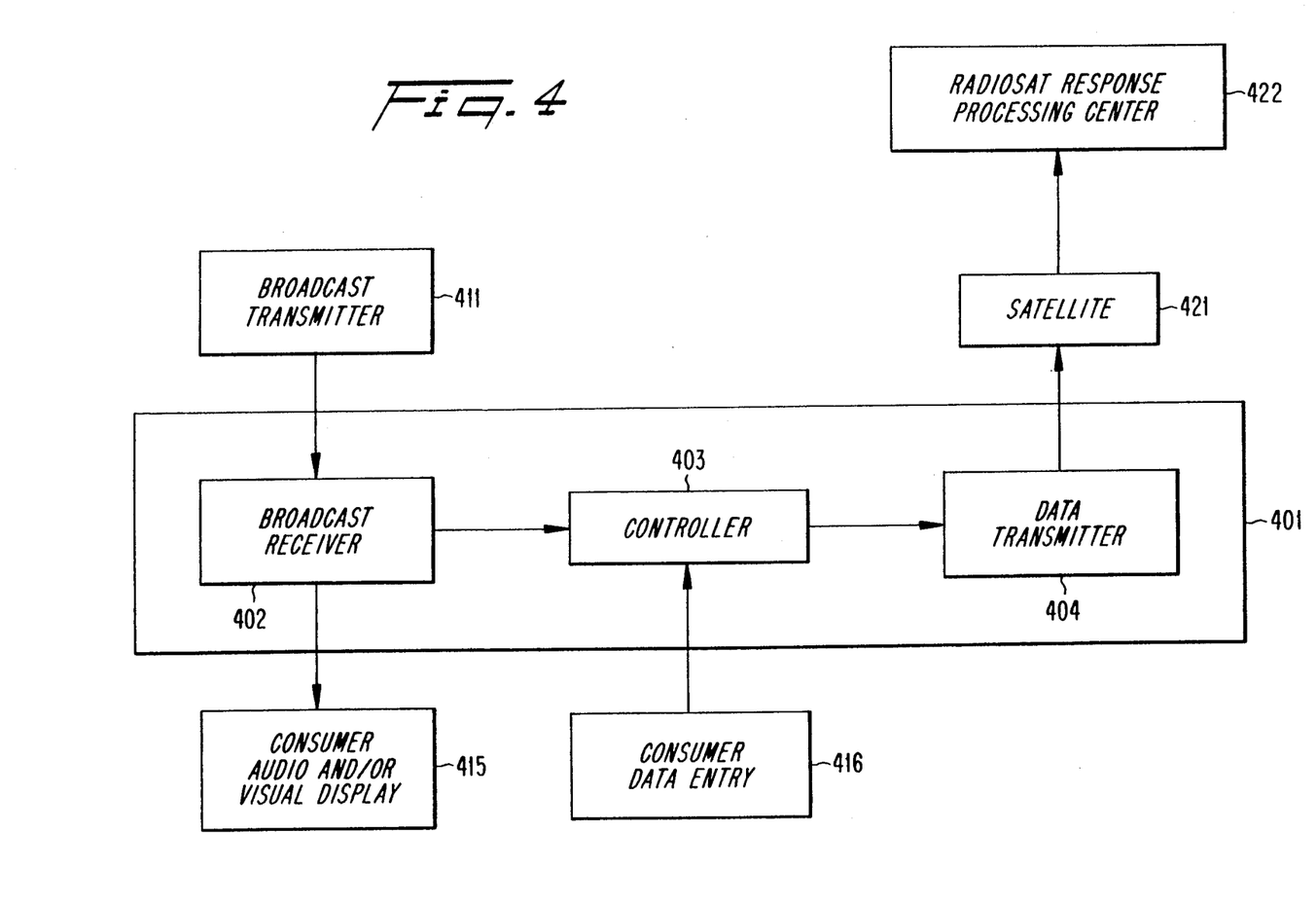
FIG. 4 is a block diagram of the user-terminal of the radio response system.

In the exemplary arrangement shown in FIG. 4, the transmitter means is embodied as a broadcast transmitter 411, the repeater means is embodied as a satellite 421, and the processing center is shown as radiosat response processing center 422. The mobile terminal 401 has receiver means shown as broadcast receiver 402, data-transmitter means as data transmitter 404, and controller means embodied as controller 403. The interface means includes consumer audio and/or video display 415, and an input device 416 for consumer data entry.

The broadcast transmitter 411 broadcasts a program signal. The broadcast transmitter 411 may be a terrestrial broadcast transmitter or a satellite broadcast transmitter. The terrestrial broadcast transmitter might transmit the program signal using analog modulation such as AM or FM, as is currently available, or digital modulation techniques. The satellite broadcast transmitter may transmit the program signal using a digital modulation technique, such as phase shift keying (PSK).

At a mobile terminal 401, the broadcast receiver 402 receives and demodulates the program signal. The broadcast receiver 402 may use an AM receiver, an FM receiver, or a digital terrestrial or satellite receiver. The satellite receiver may employ the radio satellite microchip disclosed herein.

The interface means uses the audio and/or visual display 415 for means of communicating the program signal to a user. The interface means may be a speaker when the program signal includes audio information, or visual display when the program signal includes video information. The interface means also has an input transducer 416, which, by way of example, may be a microphone, push buttons or a touch screen. The input transducer 416 generates a user-input signal. A user can, upon receiving the program signal through the interface means, response by speaking through the microphone, pushing a push button or touching a touch screen. Commands may be programmed for controlling the mobile terminal. The commands, when spoken into the microphone, are recognized and generate a user-input signal. Alternatively, a push button or position on a touch screen may generate the same user-input signal.

The controller 403 processes identification information from the program signal and generates from the processed identification information and the user-input signal, a user-data signal. The controller 403 may be a processor. The identification information can be sent on a subchannel of the program signal. In an AM or FM signal, the subchannel can be on a subcarrier of the program signal. In a digital signal, the subchannel can be a time slot in a time division multiplexed signal.

The data transmitter 404 modulates a carrier signal with the user-data signal, and transmits the modulated carrier signal as a transmitted-data signal. The data transmitter 404 may modulate a carrier frequency with the user-data signal using AM, FM or a digital modulation technique, such as PSK. The data-transmitter 404 sends the transmitted-data signal to the satellite 421.

The satellite 421 relays the transmitted-data signal to the processing center 422. The processing center 422, which receives the user-data signal from the satellite 421, demodulates the user-data signal from the transmitted-data signal, and processes information from the user-data signal, and determines identification information. This information includes the identity of the mobile terminal.

Alternatively, the system may be operated without identification information transmitted with the program signal, in which case the controller 403 would determine the program carrier frequency of the program signal, and if necessary, combine that information with timing information relating to the time of generation of the user input signal, and/or the approximate geographic location of the mobile transmitter 401, and the user input signal, to create the user data signal, to enable the processing center 422, upon receipt of the user data signal, to determine the program signal to which the user responded by comparing the program carrier frequency and time and location of user response to information on program signals received from other sources.

The present invention may also be embodied as a method for use with a broadcast transmitter 411, mobile terminal 401, satellite 421, and processing center 422. The method comprises the steps of broadcasting from the broadcast station using the broadcast transmitter 411 a program signal and receiving at the mobile terminal 401 the program signal. At the mobile terminal 401 identification information is processed from the program signal. The identification information may include the program-carrier frequency of the program signal, identification of the program signal and particular program to which the user is listening, the identification of the broadcast station, the time of an advertisement or solicitation, a code identifying the advertisement or solicitation, or any other information which may be used for identifying the program signal and a particular time and/or advertisement to which a user is responding.

The method further includes communicating at the mobile terminal 401 the program signal to a user. The program signal can be music with advertisements or solicitations periodically placed between music selections. The program signal is communicated to the user through a audio device such as a speaker. Additionally, the program signal may communicate to the user video information which would be displayed on a visual display.

The user has the option of inputting to the mobile terminal 401 a user-input signal. The user can generate the user-input signal by speaking into a microphone which converts the user's voice to a digital signal processes the converted voice signal to generate a user-input signal. For example, the user might speak the word ORDER which indicates to place an order of the item being advertised in the advertisement of the program signal. The spoken word ORDER is converted to a digital signal, identified and recognized. The resulting output is the user-input signal. Alternatively, the user may place an order by pushing a button or touching a touch screen on a display.

The method further includes using the identification information and the user-input signal to generate a user-data signal. The user-data signal preferably is a digital signal which is a combination of the identification information and the user-input signal. This step may be accomplished at the mobile terminal 401 in a controller 403.

The user-data signal is modulated on a carrier signal at a carrier frequency, and the modulated carrier frequency is transmitted by data transmitter 404 as a transmitted-data signal. The transmitted-data signal is relayed through a satellite 421 to the processing center 422.

Alternatively, the method may be operated without identification information transmitted with the program signal, in which case the controller 403 would determine the program carrier frequency of the program signal, and if necessary, combine that information with timing information relating to the time of generation of the user input signal, and/or the approximate geographic location of the mobile transmitter 401, and the user input signal, to create the user data signal, to enable the processing center 422, upon receipt of the user data signal, to determine the program signal to which the user responded by comparing the program carrier frequency and time and location of user response to information on program signals received from other sources.

The method can additionally include determining the location of the mobile terminal 401 from a position location device co-located with the mobile terminal 401. Alternatively, the position of the mobile terminal 401 may be determined from the transmitted-data signal which is relayed through at least two satellites. In the latter case, commonly known triangulation techniques are uses for determining the location and position of the mobile terminal 401 vis-a-vis the known locations of the at least two satellites. Additionally, the method can use the GPS addition to the radio satellite microchip, discussed herein.

In use, the broadcast transmitter 411 transmits a program signal which may include music, talk shows, advertisements, charitable fund raising solicitations, and other types of programs as are well known and used in the broadcast industry. At the mobile terminal 401, the broadcast receiver 402, receives the program signal and demodulates the program signal for the user. The program signal is played over a speaker, and in the event there were a visual display, also is displayed. When an advertisement, charitable solicitation, disk jockey query, or other communication inviting a listener response is sent over the program signal the user has the option to respond directly through the mobile terminal 401. The response, for example, might be ordering something which is being offered for sale. The music which was most recently played and sent over the program signal, for example, might be offered for sale on a compact disc. The user has the option of ordering the compact disc by inputting a user-input signal using input device 416. The user might generate the user-input signal by speaking into a microphone. In this case, the controller 403 is programmed to recognize the user's voice and the command. For example, the command might be ORDER. In response to ORDER, the user-input signal would send this information to order the compact disc. Alternatively, the input device 416 might be a push button or a touch screen of a display. The user merely would push the push button or touch the appropriate place on the display screen for ordering the compact disc.

The controller 403 generates a user-data signal which includes the order information generated from the input device 416. The controller 403 also may process identification information from the program signal which was received from the broadcast receiver 402. The identification information may include identification of the advertisement which offered the compact disc, for example, for sale, an identification of the broadcast transmitter 411, the carrier frequency of the program signal, or any other information which would identify the advertisement, solicitation, or other communication inviting a response. Additionally, the controller 403 may also have location information as to the location and positioning of the mobile terminal 401. The identification information and user-input signal is combined in the controller 403 as a user-data signal.

The data transmitter modulates a carrier signal at a carrier frequency with the user-data signal and transmits the modulated carrier signal as a transmitted-data signal. The data transmitter 404 may use AM, FM, or a digital modulation technique, such as PSK. The data transmitter 404 transmits the transmitted data signal to the satellite 421 which in turn relays the transmitted-data signal to the processing center 422. The processing center demodulates the user-data signal from the transmitted-data signal and processes the order from the user. The identification information and user-input signal are extracted from the user-data signal. Accordingly, the order, contribution or other response is processed from the identification information and the user-input signal.

Alternatively, in the absence of identification information transmitted in connection with the program signal, the controller 403 might determine the frequency of the program-carrier frequency of the program signal, combine that frequency information with the user-input signal, the time of the user input signal, and information for determining the geographic position of the mobile terminal 401, in order to generate the user-date signal. Upon receipt of the user-data signal, the processing center 422 can use the information in the user-data signal to identify the program signal to which the user has responded by reference to other information on content of program signal broadcast at various times, locations, and frequencies.

The position locator additionally may be used with the present invention for determining the position of the mobile terminal 401. With position information on the mobile terminal 401 along with identification information on the broadcast transmitter 411 and the program signal such as the carrier frequency or identification of the program, the processing center 422 can determine the advertisement and process an order by a user.

A user may input a credit card number for placing an order, or a user's credit card number may be stored at the processing center. Alternatively, a user may be billed for orders placed on the radio response system.

It will be apparent to those skilled in the art that various modifications can be made to the radio response system and method of the instant invention without departing from the scope or spirit of the invention, and it is intended that the present invention cover modifications and variations of the radio response system and method provided they come in the scope of the appended claims and their equivalents.

We claim:

1. A radio response system for user with a processing center comprising:
    transmitter-means for broadcasting a program signal;
    a plurality of mobile stations, each mobile station including,
        receiver-means for receiving the program signal;
        interface means for communicating the program signal to a user;
        controller means for processing program identification information from the program signal and for generating from the processed program identification information and a user-input signal, a user-data signal; and
        data-transmitter means for transmitting the user-data signal as a transmitted-data signal;
    repeater means responsive to receiving the transmitted-data signal for relaying the user-data signal to said processing center; and
    location means responsive to receiving the transmitted-data signal through at least two of the repeater means for determining a location of said mobile station.

2. The radio response system as set forth in claim 1 wherein said repeater means includes a satellite for relaying the transmitted data signal to said processing center.

3. A mobile station for use with a broadcast station for broadcasting a program signal, a processing center and a plurality of mobile stations, said mobile station comprising:
    a broadcast receiver for receiving the program signal;
    interface means for communicating the program signal to a user;
    controller means responsive to the program signal for processing program identification information from the program signal, responsive to a user input from the user for generating a user-input signal, and for combining the processed program identification information and the user-input signal as a user-data signal;
    data-transmitter means responsive to the user-data signal for transmitting the user-data signal as a transmitted-data signal to said processing center; and
    location means responsive to receiving the transmitted-data signal through at least two repeater means for detecting a location of said mobile station.

4. The radio response system as set forth in claim 1 wherein said interface means includes:
    a speaker for communicating the program signal to the user; and
    means responsive to a user input from the user for generating the user-input signal.

5. The radio response system as set forth in claim 1 wherein said interface means includes:
    a display for communicating the program signal to the user; and
    means responsive to a user input from the user for generating the user-input signal.

6. The radio response system as set forth in claim 1, further including:
    a microphone; and
    said interface means is responsive to the user speaking to said microphone for generating the user-input signal.

7. The radio response system as set forth in claim 1 wherein said transmitter means includes a terrestrial transmitter for broadcasting the program signal.

8. The radio response system as set forth in claim 1 wherein said transmitter means includes a satellite transmitter for broadcasting the program signal.

9. The radio response system as set forth in claim 1 wherein said data-transmitter means includes a PSK modulator.

10. The radio response system as set forth in claim 1 wherein said data-transmitter means includes an FM modulator.

11. The radio response system as set forth in claim 1 wherein said data-transmitter means includes a spread spectrum modulator.

12. The radio response system as set forth in claim 1 wherein said repeater means includes a satellite for relaying the transmitted-data signal to said processing center.

13. The radio response system as set forth in claim 1 wherein said repeater means includes a terrestrial repeater for relaying the transmitted-data signal to said processing center.

14. The radio response system in claim 1 wherein the controller means combines timing information in the user-data signal; and
wherein the processing center determines the time of generation of the user-input signal from the timing information of the user-data signal.

* * * * *